United States Patent [19]
Kishi

[11] Patent Number: 6,086,179
[45] Date of Patent: Jul. 11, 2000

[54] LIQUID PRESENCE/ABSENCE DETECTING DEVICE USING DIGITAL SIGNALS IN OPPOSITE PHASE

[75] Inventor: Motoshi Kishi, Nagoya, Japan

[73] Assignee: Brother Kogyo Kabushiki Kaisha, Nagoya, Japan

[21] Appl. No.: 08/942,297

[22] Filed: Oct. 1, 1997

[30] Foreign Application Priority Data

Oct. 18, 1996 [JP] Japan ..................................... 8-297179

[51] Int. Cl.[7] .................................................... B41J 2/175
[52] U.S. Cl. ............................. 347/7; 73/304 R; 340/620
[58] Field of Search ........................... 347/7, 19; 399/24, 399/27; 73/304 R; 340/620

[56] References Cited

U.S. PATENT DOCUMENTS

| | | | |
|---|---|---|---|
| 4,788,861 | 12/1988 | Lichti | 73/304 R |
| 5,613,399 | 3/1997 | Hannan et al. | 73/304 C |
| 5,682,184 | 10/1997 | Stephany et al. | 347/7 |

*Primary Examiner*—John Barlow
*Assistant Examiner*—Craig A. Hallacher
*Attorney, Agent, or Firm*—Oliff & Berridge, PLC

[57] ABSTRACT

A pair of digital signals outputted from output ports of a CPU in opposite phase are applied to a pair of electrodes attached to an ink cartridge through inverters. A digital signal developed from the electrode connected to a resistor having a resistance value larger than or substantially equal to an ink resistance is inputted to a detection port through a hysteresis inverter. The CPU detects the presence/absence of ink in the cartridge, based on the phase relation of the digital signal applied through the hysteresis inverter with the digital signal outputted from the output port of the CPU or based on the presence/absence of the digital signal from the hysteresis inverter.

27 Claims, 12 Drawing Sheets

|    | (a)  | (b)  | (c)  | (d)  |
|----|------|------|------|------|
| V1 | 0.00 | 0.00 | 6.00 | 6.00 |
| V2 | 6.00 | 6.00 | 0.00 | 0.00 |
| V3 | 2.30 | 3.50 | 2.30 | 3.50 |
| R1 | 1.83 | 1.83 | 1.83 | 1.83 |
| R2 | 2.94 | 1.31 | 1.14 | 2.56 |

FIG. 13 b

|    | (a)  | (b)  | (c)  | (d)  |
|----|------|------|------|------|
| V1 | 0.00 | 0.00 | 6.00 | 6.00 |
| V2 | 6.00 | 6.00 | 0.00 | 0.00 |
| V3 | 2.30 | 3.50 | 2.30 | 3.50 |
| R1 | 5.71 | 5.71 | 5.71 | 5.71 |
| R2 | 9.19 | 4.08 | 3.55 | 7.99 |

FIG. 13 c

|    | (a)  | (b)  | (c)  | (d)  |
|----|------|------|------|------|
| V1 | 0.00 | 0.00 | 6.00 | 6.00 |
| V2 | 6.00 | 6.00 | 0.00 | 0.00 |
| V3 | 2.30 | 3.50 | 2.30 | 3.50 |
| R1 | 2.63 | 2.63 | 2.63 | 2.63 |
| R2 | 4.23 | 1.88 | 1.63 | 3.68 |

FIG. 13 d

|    | (a)  | (b)  | (c)  | (d)  |
|----|------|------|------|------|
| V1 | 0.00 | 0.00 | 6.00 | 6.00 |
| V2 | 6.00 | 6.00 | 0.00 | 0.00 |
| V3 | 2.30 | 3.50 | 2.30 | 3.50 |
| R1 | 0.94 | 0.94 | 0.94 | 0.94 |
| R2 | 1.52 | 0.67 | 0.59 | 1.32 |

FIG. 13 e

| INK | R2 (KΩ) | |
|---|---|---|
|   | MIN | MAX |
| YELLOW | 1.14 | 2.94 |
| MAGENTA | 3.55 | 9.19 |
| CYAN | 1.63 | 4.23 |
| BLACK | 0.59 | 1.52 |

LIQUID PRESENCE/ABSENCE DETECTING DEVICE USING DIGITAL SIGNALS IN OPPOSITE PHASE

CROSS REFERENCE TO RELATED APPLICATION

This application incorporates herein by reference Japanese Patent Application No. 8-297179 filed on Oct. 18, 1996.

BACKGROUND OF THE INVENTION

1. Field of the Invention

The present invention relates to a device for detecting the presence or absence (presence/absence) of liquid such as ink and, more particularly, to a device suitable for detecting the presence/absence of ink held within an ink cartridge mounted in an ink-jet printing device for discharging droplets of ink through a nozzle to thereby effect printing on a medium to be recorded.

2. Description of the Related Art

Figure 17A:
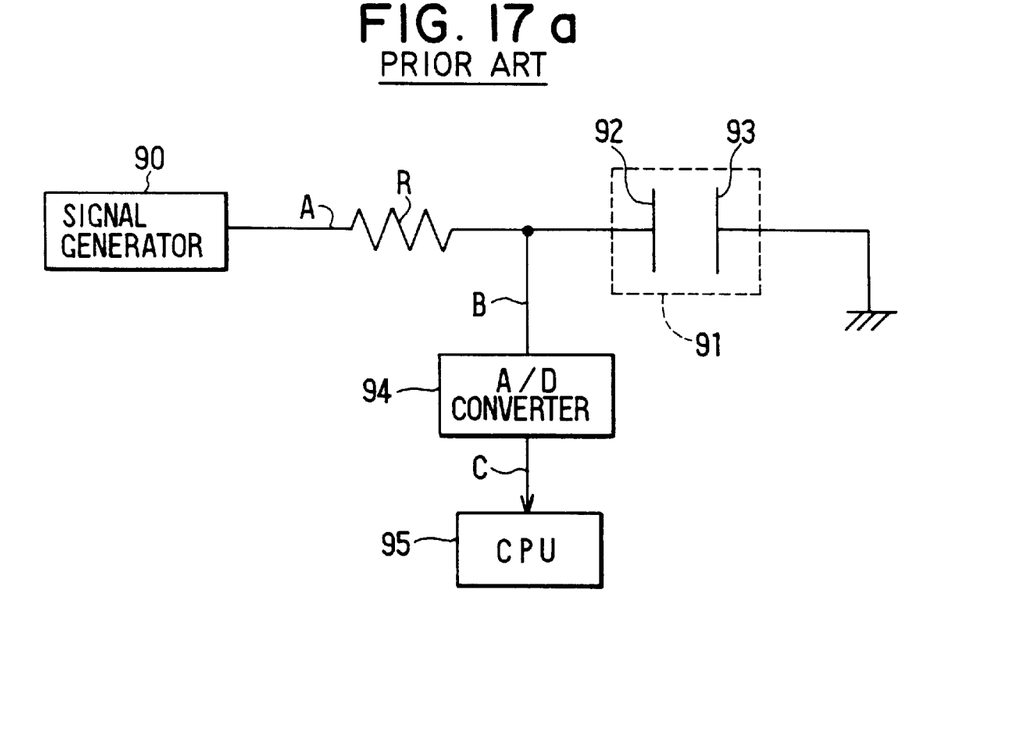
FIG. 17a is an electric diagram showing a conventional ink presence/absence detecting device.

It has been known to detect the presence/absence of liquid such as ink by a detecting device shown in FIG. 17a. This detecting device comprises a pair of electrodes 92 and 93 provided within an ink cartridge 91 in an opposing relationship, a signal generating circuit 90 for applying a signal A in a pulse or digital form to the electrodes 92 and 93, a resistor R electrically connected between the signal generating circuit 90 and the electrode 92, an A/D converter circuit 94 for receiving a signal B developed between the resistor R and the electrode 92. The voltage amplitude of this signal B varies with a resistance of ink between the electrodes 92 and 93 and is converted into a digital signal C by the A/D converter circuit 94. A CPU 95 receives the digital signal C from the A/D converter circuit 94 therein and detects the presence/absence of ink based on the input digital signal C.

Figure 17B:
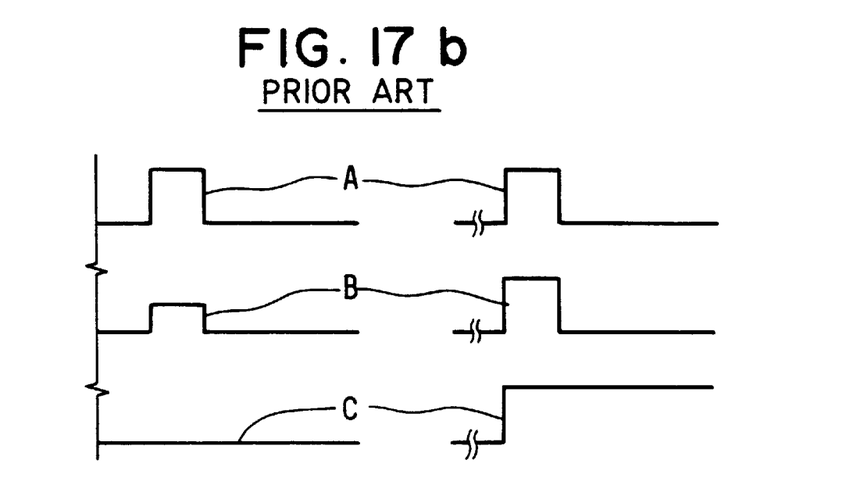

When the signal A is generated from the signal generating circuit 90, the signal B whose voltage is lower than that of the signal A is developed between the resistor R and the electrode 92 due to the ink resistance between the electrodes 92 and 93 as long as the ink exists within the ink cartridge 91, as shown at the left side in FIG. 17b. This voltage magnitude of signal B is converted into the digital signal C ("0" or low level) as shown by C in FIG. 17b and the CPU 95 determines the existence of ink in response to this digital signal C (low value). When no ink is held within the ink cartridge 91, the signal B comes to have the same voltage magnitude as that of the signal A as shown by A at the right side in FIG. 17b. This signal B is converted into the digital signal C ("1" or high level) by the A/D converter circuit 94 as shown by C at the right side in FIG. 17b. The CPU 95 determines the absence of ink in response to this digital signal C (high value). Thus, the CPU 95 detects the presence/absence of ink based on whether the input digital signal C has a high value or a low value.

However, the conventional detecting device requires that the signal B whose voltage level varies according to the presence/absence of ink is converted into the corresponding digital signal C by the A/D converter circuit 94.

As a result, since the detecting device becomes complex in circuit configuration as long as the A/D converter circuit 94 is included therein, it is more likely that the occurrence of its failure increases, thus degrading the reliability of detection of the presence/absence of ink.

SUMMARY OF THE INVENTION

It is therefore an object of the present invention to provide a liquid presence/absence detecting device which is simplified in construction to eliminate the need for an A/D converter circuit.

It is another object of the present invention to provide a liquid presence/absence detecting device which is suitable for use with an ink-jet printing device and capable of detecting the presence/absence of ink accurately by the use of digital signals only.

According to the present invention, a pair of digital signals in a pulse train form at a fixed frequency but different in phase from each other are applied to a pair of electrodes for extracting a resistance value between two points in a liquid chamber. One of the digital signals is applied to the corresponding electrodes through a resistor. When the digital signals are applied to the pair of electrodes, a digital signal changed according to the presence/absence of ink or resistance between the electrodes is developed between the one electrode and the resistor. This changed digital signal is used to detect the presence/absence of the liquid based on either one of the phase or presence/absence of the changed digital signal.

Preferably, the resistor has a resistance value substantially equal to or larger than a resistance value of the liquid. More preferably, the electrodes are positioned in an ink chamber for an ink-jet printing device.

BRIEF DESCRIPTION OF THE DRAWINGS

Other objects, features and advantages of the invention will be better understood from the following detailed description taken in connection with the accompanying drawings in which:

FIG. 17b is a chart showing waveforms of signals developed at detection points in FIG. 17a.

DETAILED DESCRIPTION OF THE PRESENTLY PREFERRED EMBODIMENTS

A liquid presence/absence detecting device of the present invention will hereinafter be described with reference to embodiments which is applied to a color ink-jet printing device to detect the presence/absence of ink as the liquid to be detected.

As shown in FIGS. 1, 2a–2c and 15, each ink cartridge 3 (four cartridges 3a–3d including different color inks) has a sponge holding chamber 35 for accommodating an ink-containing sponge 33 therein and an ink chamber 31 for holding ink only. Both chambers 31 and 35 are in communication with a bottom communication hole 37 in the neighborhood of the bottom of the ink cartridge 3. A top communication hole 38 is provided in an upper portion of the sponge holding chamber 35 in communication with an outside atmosphere so that the ink chamber 31 is kept filled with the ink supplied from the sponge chamber 33 through the communication hole 37. An ink supply port 32 for supplying the ink filled in the ink chamber 31 to an ink-jet head 2 is provided in a lower portion of the ink chamber 31. Further, a pair of electrodes 16 and 18 for detecting the presence/absence of ink is provided at an upper portion of the ink chamber 31 in an opposing relationship.

Figure 2A:
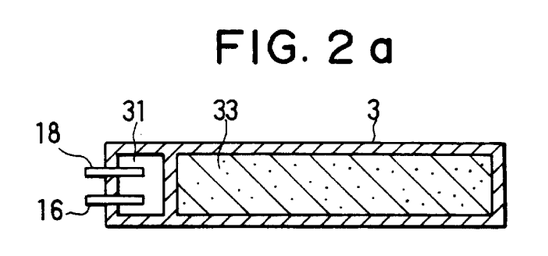
FIGS. 2a–2c are a top cross-sectional view, a front view and a side cross-sectional view of an ink cartridge shown in FIG. 1.
Figure 2B:
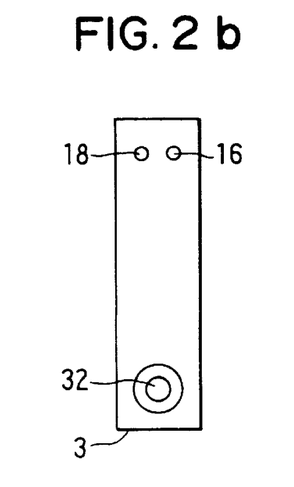
Figure 2C:
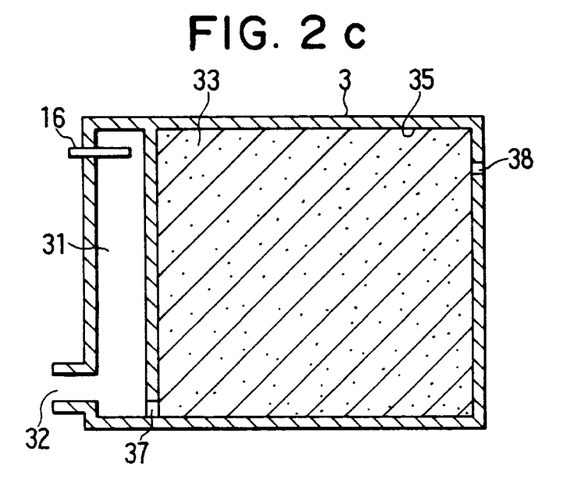

As the ink held within the ink cartridge 3 is consumed, the ink in the sponge holding chamber 35 first decreases and the ink in the ink chamber 31 then decreases after the ink in the sponge holding chamber 35 has been made empty. At this time, air introduced from the atmosphere communication hole 38 enters into the ink chamber 31 through the sponge 33 and the communication hole 37 so that the level of the ink held within the ink chamber 31 is gradually lowered. A state of electric conduction (resistance value) between the pair of electrodes 16 and 18 varies according to the height of the level of the ink held within the ink chamber 31. More specifically, the resistance value between the electrodes 16 and 18 increases when the ink level falls below the electrodes 16 and 18.

Figure 1:
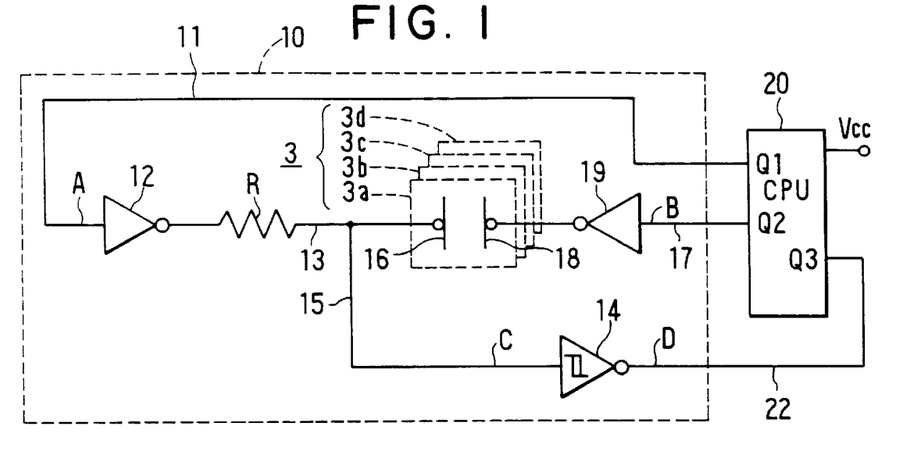
FIG. 1 is a circuit diagram showing a configuration of an ink presence/absence detecting device according to the present invention.

In the ink presence/absence detecting device shown in FIG. 1, a detection circuit 10 for detecting the presence/absence of ink is provided with an inverter 12. An output port Q1 of a CPU 20 provided in the ink-jet printing device 1 (FIG. 15) is electrically connected to the input of the inverter 12 through a signal line 11. One end of a resistor R having a resistance value R2 is electrically connected to the output of the inverter 12. The other end of the resistor R is electrically connected via a signal line 13 to the electrode 16 provided within the ink cartridge 3.

The electrode 18 is electrically connected to the output of an inverter 19. The input of the inverter 19 is electrically connected to an output port Q2 of the CPU 20 through a signal line 17. Thus, digital signals (pulse trains at a fixed frequency) outputted from the output ports Q1 and Q2 of the CPU 20 are applied to the electrodes 16 and 18 respectively. As the ink cartridge 3 moves, each of four cartridges 3a–3d are applied with the digital signals sequentially.

A signal line 15 is electrically connected to the signal line 13. The signal line 15 is electrically connected to the input of a hysteresis inverter 14 such as a Schmidt trigger circuit. The output of the hysteresis inverter 14 is electrically connected to a detection port Q3 corresponding to an input port of the CPU 20 through a signal line 22.

Figure 12:
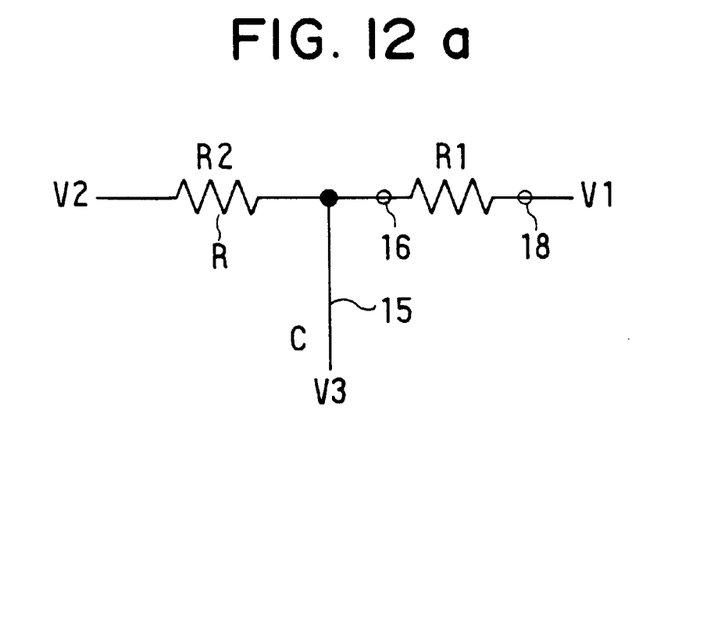
FIG. 12a is an equivalent circuit diagram of a circuit including electrodes and a resistor shown in FIG. 1.
FIG. 12b is a graph showing threshold levels of a hysteresis inverter shown in FIG. 1.

Here, the resistance value of ink between the electrodes 16 and 18 at the time that the ink is sufficiently filled within the ink chamber 31, is defined as R1. The electrodes 16 and 18 and the resistor R is represented by an equivalent circuit shown in FIG. 12a with a resistance between the electrodes 16 and 18 being assumed to be R1. The hysteresis inverter 14 has two threshold levels Vp and Vn as shown in FIG. 12b.

The ink cartridges 3a–3d contain therein black ink, cyan ink, magenta ink and yellow ink respectively for use in the color ink-jet printing device. Each of the electrodes 16 and 18 has a diameter of 0.5 mm and a length of 2.5 mm. The distance between the electrodes 16 and 18 is 3.5 mm. Further, resistance values R1 of the individual inks, which have been measured experimentally by applying a digital signal whose voltage is 6V and whose frequency F is 10 KHz, between the electrodes 16 and 18 at a room temperature of 25° C., are 1.83 KΩ for yellow, 5.71 KΩ for magenta, 2.63 KΩ for cyan and 0.94 KΩ for black respectively.

Further, the threshold levels of the hysteresis inverter 14 (Toshiba TC74HC14AP) at a source voltage of 6V under the room temperature of 25° C. is as follows: the threshold level Vn at the time that an input voltage changes from a high to a low levels is 2.3V and the threshold level Vp at the time that the input voltage changes from the low to high levels is 3.5V. A clock frequency of the CPU 20 is 20 MHz.

The detection of the presence/absence of ink will be described below in detail with reference to two embodiments shown in FIGS. 14a and 14b respectively. According to the first embodiment (FIG. 14a) the presence/absence of the ink is detected based on the phase of the digital signal developed on the signal line 15, while according to the second embodiment (FIG. 14b) the presence/absence of the ink is detected based on the presence/absence of the digital signal on the signal line 15. In the following description, the low frequency F is 10 KHz and the high frequency F is 1 MHz, for example. Further, the resistance value R2 of the resistor R is set to 100 KΩ, for example, which is much larger than the resistance value R1 of each ink.

First Embodiment

Figure 14:
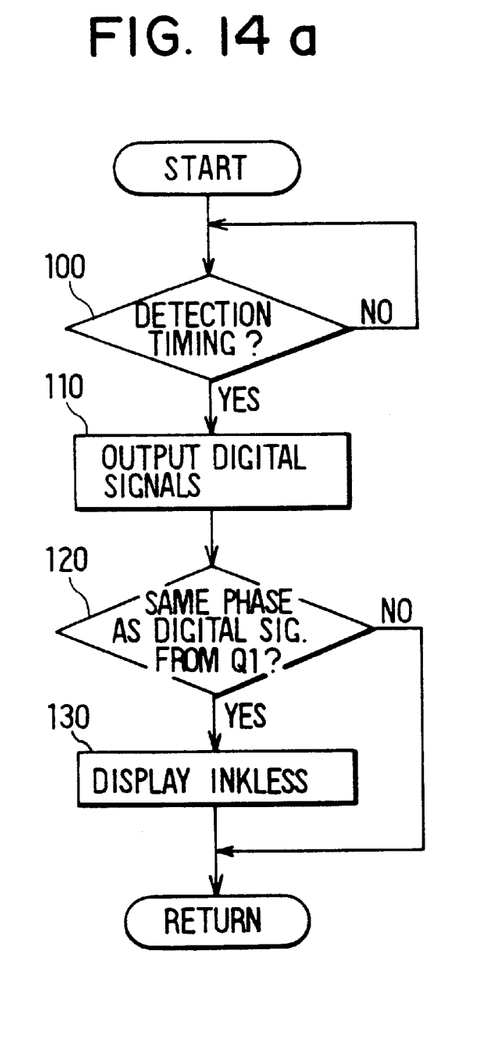
FIGS. 14a and 14b are flowcharts of processing of a CPU shown in FIG. 1 and used in the first and the second embodiments of the present invention.

In the first embodiment shown in FIG. 14a, in order to detect the presence/absence of the ink based on the phase of the digital signal, the frequency F of the digital signals applied between the electrodes 16 and 18 is set rather low (10 KHz) and the resistance value R2 of the resistor R is set larger than the resistance value R1 of the ink.

Figure 3:
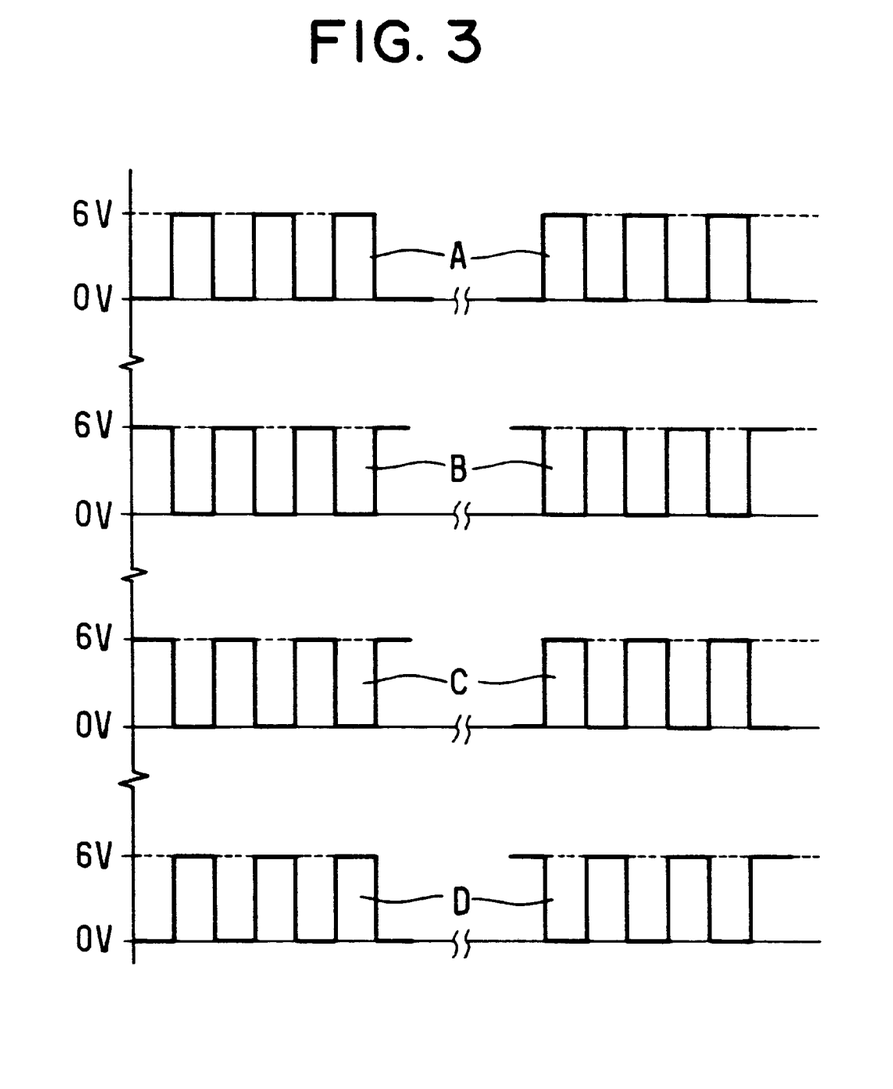
FIG. 3 is a timing chart showing digital signals developed at respective detection points in the first embodiment of the present invention.

When the CPU 20 determines that it is the timing for detecting the presence/absence of the ink, which may be at the execution of purging, the completion of printing or the like (Step 100), a digital signal A whose voltage and frequency are 6V and 10 KHz respectively, is outputted from the output port Q1 to the inverter 12 and a digital signal B opposite in phase with the digital signal A outputted from the output port Q1 is outputted from an output port Q2 of the CPU 20 to the inverter 19 at the same frequency as the digital signal A, as shown by A and B in FIG. 3 (Step 110).

The digital signals A and B inputted to the inverters 12 and 19 are inverted respectively and the inverted digital signals are applied to the corresponding electrodes 16 and 18. A digital signal (digital signal) C which is varied with the ratio of resistances R1 and R2 is outputted to the signal line 15. However, since the resistance value R1 between the electrodes 16 and 18 is larger than the resistance value R2 of the resistor R in the absence of ink, the digital signal A inputted to the inverter 12 is inverted and outputted to as the digital signal C as shown at the left side in FIG. 3. That is, the digital signal C is in the opposite phase relation to the digital signal A and in the same phase relation to the digital signal B. On the other hand, since the resistor R2 is larger than the resistor R1 in resistance value in the presence of ink, the digital signal C is developed on the signal line 15 in the same phase as the output signal of the inverter 19 as shown at the right side in FIG. 3. That is, the digital signal C is in the same phase relation with the digital signal A and in the opposite phase relation with the digital signal B. The digital signal C is inverted by the hysteresis inverter 14 and an inverted digital signal D shown in FIG. 3 is applied to the CPU 20.

When CPU 20 determines that the digital signal D inputted to the detection port Q3 is in phase with that of the digital signal A outputted from the output port Q1 of the CPU 20 (Step 120), the CPU 20 performs a display such as illumination for indicating the absence of the ink or inkless condition (Step 130).

According to the first embodiment as described above, since the resistance value R2 of the resistor R is set larger than the resistance value R1 of the ink, the presence/absence of the ink can be detected based on the phase of the digital signal inputted to the detection port Q3 of the CPU 20 without requiring analog-digital (A/D) conversion.

Thus, since the detecting device can be simplified in circuit configuration, the reliability of detecting device can be enhanced. Even if electric noise is included in the digital signals, the noise is removed by the inverters 12 and 19 and the hysteresis inverter 14, whereby the presence/absence of the ink can be detected with high accuracy.

In this embodiment, the phase of the digital signal D inputted to the detection port Q3 of the CPU 20 may be compared with the phase of the digital signal B outputted from the output port Q2 of the CPU 20. In this case, the display of inkless condition may be performed when the phase of the digital signal D differs from the phase of the digital signal B.

In the first embodiment described above, the resistance value R2 of the resistor R is set to the value larger than the ink resistance R1. However, the resistance value R2 needs to be set to a value larger than 9.19 KΩ corresponding to the maximum value of magenta, which is the largest of the maximum values of individual inks, in order to set the signal outputted from the hysteresis inverter 14 to one changed in phase even in the case of any ink. The resistance value R2 is set to 10 KΩ, for example. However, the resistance value R2 is normally set to about 30 KΩ corresponding to twice or three times the resistance value of 10 KΩ from a standpoint of assuring proper operation. Thus, the presence/absence of ink can be detected based on the phase of the digital signal even in the case of any ink.

Second Embodiment

The second embodiment is directed to the detection of the presence/absence of ink based on the presence/absence of a pulse.

From the fact that the resistance value R1 varies from ink color to ink color and for the purpose of using the detecting device for all four ink colors (yellow, magenta, cyan and black), it is necessary to determine the allowable range of the resistance value R2 of the resistor R for detecting the presence/absence of each ink based on the presence/absence of a digital signal D is calculated.

Conditions for changing the digital signal D outputted from the hysteresis inverter 14 according to the presence/absence of the ink will first be explained.

Assuming that in the equivalent circuit shown in FIG. 12a, V1=voltage on the ink cartridge side, V2=voltage on the resistor R side, V3=voltage inputted to the hysteresis inverter 14, R1=resistance value of ink between the electrodes 16 and 18, and R2=resistance value of the resistor R, an 25 electric current flowing on the ink cartridge side is identical to that flowing in the resistor R. Therefore, the following equation is established:

$$(V3-V1)/R1 = (V2-V3)/R2 \tag{1}$$

Thus, R2 is determined from the equation (1) as follows:

$$R2 = R1(V2-V3)/(V3-V1) \tag{2}$$

Since the hysteresis inverter 14 has the two threshold levels Vn and Vp as described above, the condition for the input voltage V3 of the hysteresis inverter 14, which is required to avoid a change in the output of the hysteresis inverter 14, corresponds to any of (1) high level of V3>Vn and low level of V3>Vn, (2) high level of V3<Vp and low level of V3>Vn, and (3) high level of V3<Vp and low level of V3>0 as shown in FIG. 12b.

With four conditions of (a)=(V1=0V, V2=6V and V3=Vn), (b)=(V1=0V, V2=6V and V3=Vp), (c)=(V1=6V, V2=0V and V3=Vn) and (d)=(V1=6V, V2=0V and V3=Vp) being set to the equation (2), the resistance value R2 needs to satisfy the following requirements (i)–(iii).

(i): To cause the voltage V3 of the input signal to meet the condition (1), the resistance value calculated under the condition (a)>resistance value R2>the resistance value calculated under the condition (c).

(ii): To cause the voltage V3 to meet the condition (2), the resistance value calculated under the condition (a) and resistance value calculated under the condition (d)>resistance value R2>the resistance value calculated under the condition (c) and the resistance value calculated under the condition (b).

(iii): To cause the voltage V3 to meet the condition (3), the resistance value calculated under the condition (d)>resistance value R2>the resistance value calculated under the condition (b).

Figure 13:
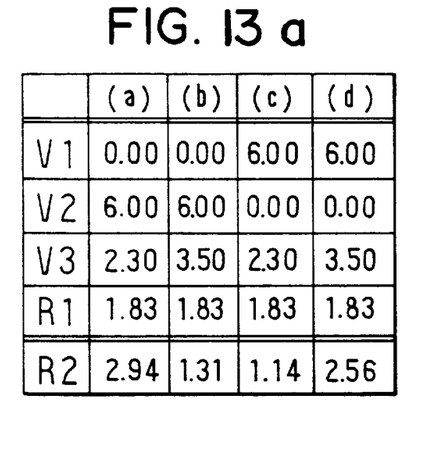
FIGS. 13a–13d are tables of calculation results of resistance values of various inks and voltages for detecting the presence/absence of ink.
FIG. 13e is a table of a summary of minimum and maximum values in the allowable range which is obtained from the result of calculation shown in FIGS. 13a–13d.

Substituting the specific values (Vn=2.3V and Vp=3.5V) in the equation (2) under the conditions (a)–(d) and calculating the resistance value R2 at each ink yield the result of calculation shown in FIG. 13a. Summarizing the minimum and maximum values of the resistance value R2 at each ink from the above result of calculation yields the result shown in FIG. 13b.

That is, the selection of magnitude of the resistance value R2 within the range from the minimum value to the maximum value shown in FIG. 13b allows the digital signal D to be outputted or not outputted from the hysteresis inverter 14 according to the presence/absence of the ink. In FIGS. 13a–13d, the units of V1 through V3 are defined as V (volt) and the units of R1 and R2 are defined as KΩ kilo ohm).

The operation of the second embodiment will be described with reference to the flowchart of FIG. 14b and time charts of FIGS. 4–11.

It is assumed first that the resistance value R2 falls within the range (i) and is set to be larger than the ink resistance R1, while the frequency of the digital signals is set low. When the CPU 20 determines that it is the timing for detecting the presence/absence of the ink which may be upon the execution of purging, the completion of print or the like (Step 100), digital signals A and B opposite in phase from each other are outputted from output ports Q1 and Q2 and applied to the electrodes 16 and 18 (Step 110). Then, the digital signal D is outputted from the hysteresis inverter 14 as shown by D at the left side in FIG. 4 in the absence of ink. This signal D is inputted to the detection port Q3 of the CPU 20. The CPU 20 determines the presence of the pulse (Step 120) and performs a display of inkless condition (Step 130).

Figure 4:
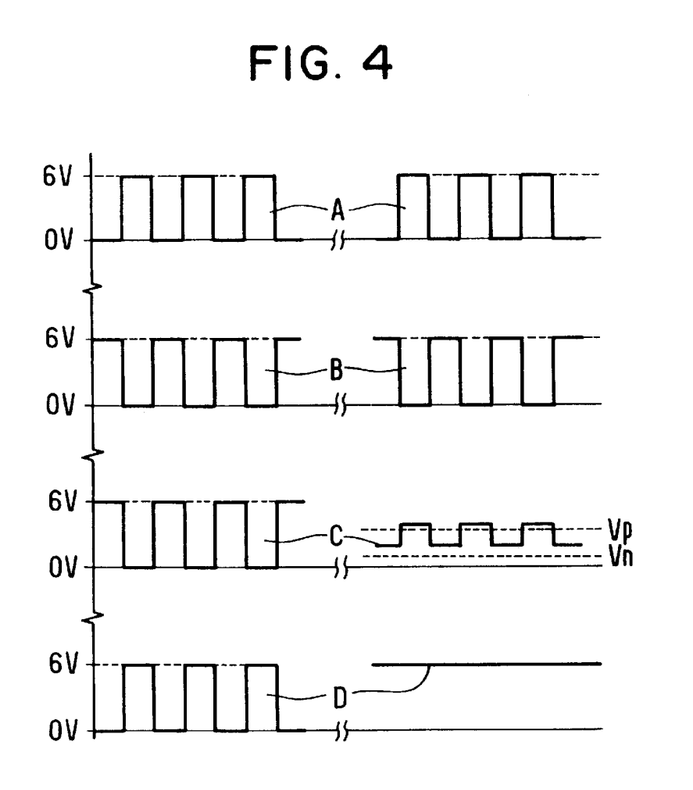
FIGS. 4–11 are timing charts showing digital signals developed at respective detection points in the second embodiment of the present invention.

When the ink exists, the hysteresis inverter 14 is supplied with the signal C (V3) as shown by C at the right side in FIG.

4. The low level of this signal C is larger than the threshold level Vn and the high level is larger than the threshold level Vp, but smaller than an applied voltage Vcc. Therefore, a digital signal having a predetermined or fixed 6V is outputted from the hysteresis inverter 14 as indicated by D at the right side in FIG. 4. The CPU 20 determines the absence of the digital signal (Step 120) and terminates a process for detecting the presence/absence of the ink.

Figure 7:
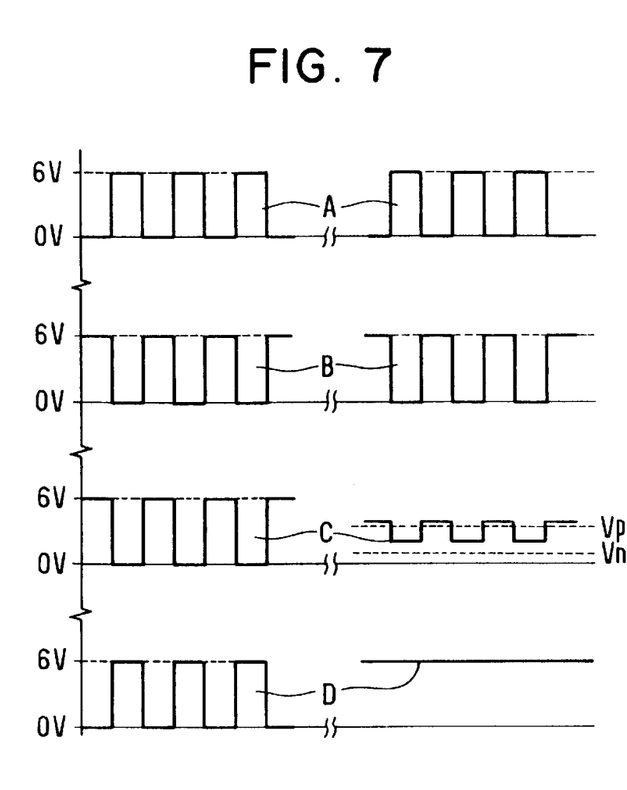

Provided that the resistance value R2 falls within the range (i) and is set to be smaller than the resistance value R1 of ink while the frequency of the digital signals A and B is set low, the digital signal C different in phase from the digital signal shown by C in FIG. 4 but having the same low and high levels, is inputted to the hysteresis inverter 14 as shown in FIG. 7 when the ink exists. Since the digital signal D having a fixed 6V is outputted from the hysteresis inverter 14 as indicated by D at the right side in FIG. 7, the CPU 20 can detect the presence/absence of ink, based on the presence/absence of the digital signal.

Figure 5:
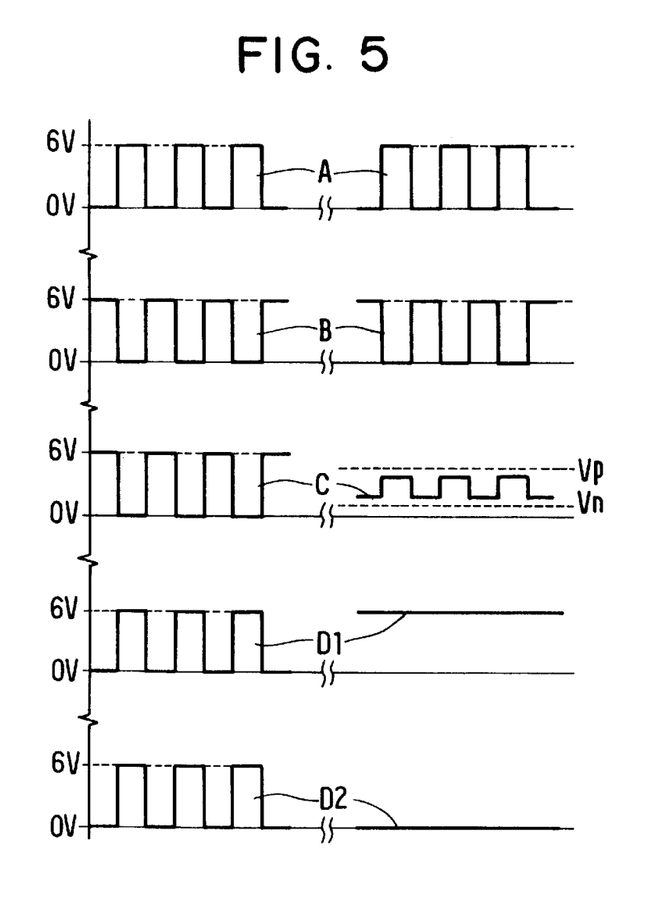

Next, it is assumed that the resistance value R2 falls within the range (ii) and is set to be larger than the resistance value R1 of ink with the frequency of the digital signals A and B being set low, the digital signal C inputted to the hysteresis inverter 14 has a low level larger than a threshold level Vn and a high level smaller than the threshold level Vp as shown at the right side in FIG. 5. Therefore, under the presence of ink, the digital signal D outputted from the hysteresis inverter 14 results in a fixed voltage level waveform shown by D1 or D2 at the right side in FIG. 5.

That is, when the digital signal C inputted to the hysteresis inverter 14 is inputted in timing required to rise from the low to high levels, the digital signal D outputted from the hysteresis inverter 14 becomes a signal having a fixed 6V ("1" or high level) shown by D1. On the other hand, when the digital signal C is inputted in timing required to fall from the high to low levels, the digital signal D outputted from the hysteresis inverter 14 becomes a signal having a fixed 0V ("0" or low level).

Thus, when the digital signal D inputted to the detection port Q3 is in the pulse train form at the fixed frequency at the left side in FIG. 5, the CPU 20 can determine the absence of ink. On the other hand, when it is not in the pulse form but in the fixed level as shown at the right side in FIG. 5, the CPU 20 can determine the presence of ink.

Figure 8:
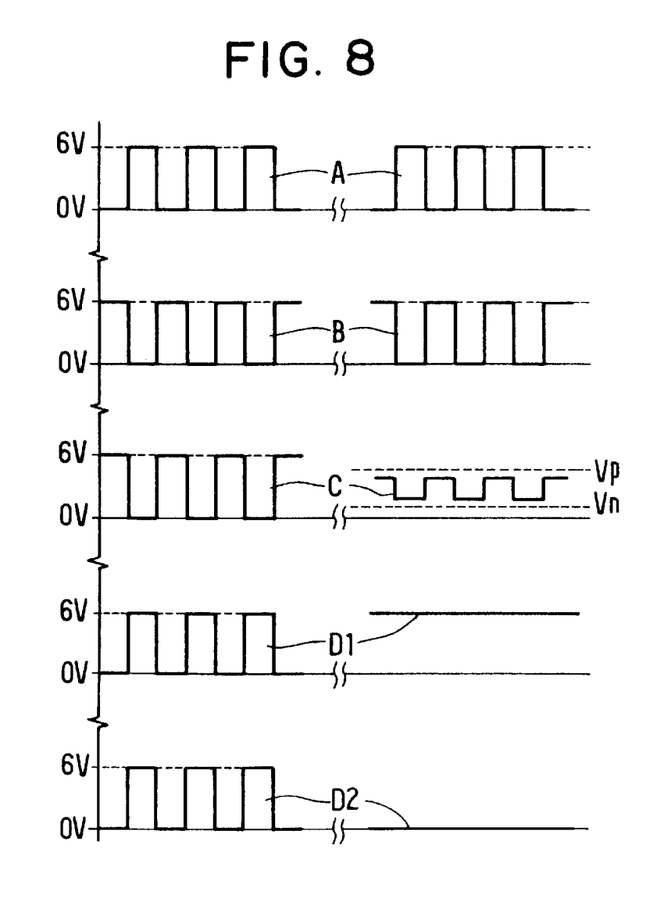

Provided that the resistance value R2 falls within the range (ii) and is set to be smaller than the resistance value R1 of ink, the digital signal C becomes different in phase from the digital signal C shown by C in FIG. 5 while having the same low and high levels under the presence of ink, as shown at the right side in FIG. 8. With this digital signal C being inputted to the hysteresis inverter 14, the digital signal D has a fixed 6V or 0V is outputted from the hysteresis inverter 14 as shown by D1 or D2 at the right side in FIG. 8. Thus, the CPU 20 can detect the presence/absence of ink, based on the presence/absence of the pulse.

Further, it is assumed that the resistance value R2 falls within the range (iii) and is set to be larger than the resistance value RI of ink with the frequency of the digital signals A and B being set low. In this case, under the presence of ink, the digital signal C inputted to the hysteresis inverter 14 has a low level smaller than the threshold level Vn and a high level smaller than the threshold level Vp as shown by C at the right side in FIG. 6. Therefore, the digital signal D outputted from the hysteresis inverter 14 becomes a signal having a fixed 0V as indicated by D at the right side in FIG. 6.

Figure 6:
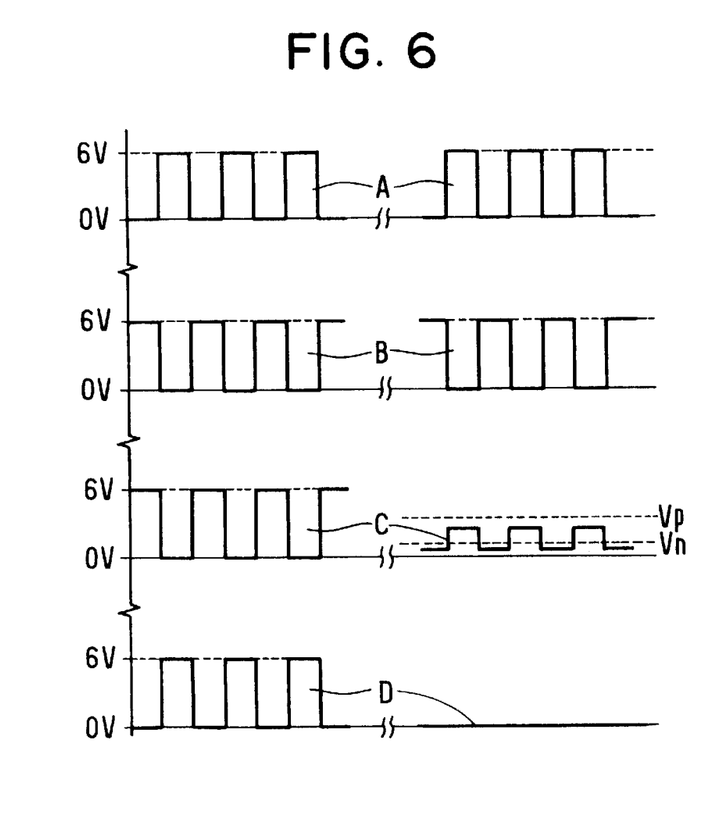

Thus, when the digital signal D inputted to the detection port Q3 is in the pulse train form, the CPU 20 can determine the absence of ink. On the other hand, when the digital signal D is not in the pulse train form, the CPU 20 can determine the presence of ink.

Figure 9:
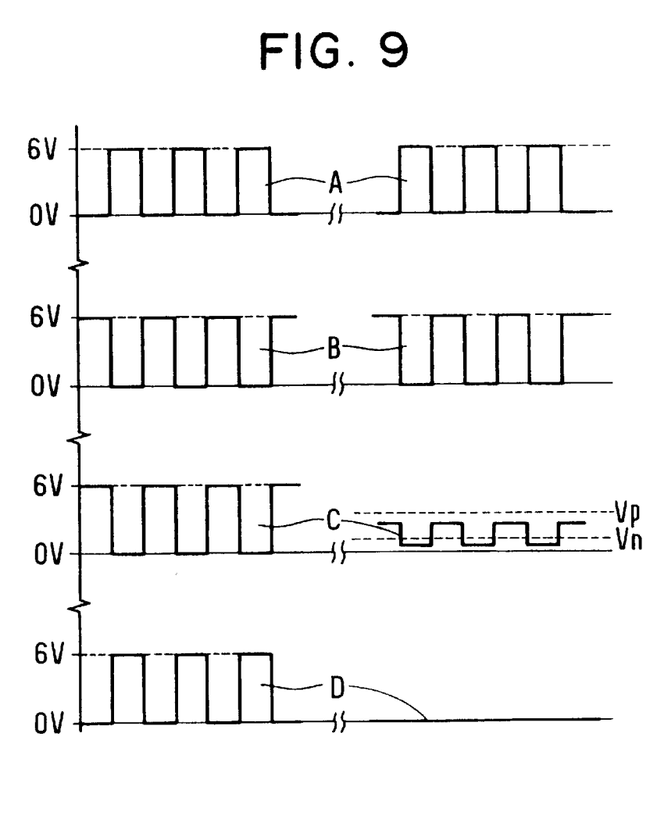
Figure 10:
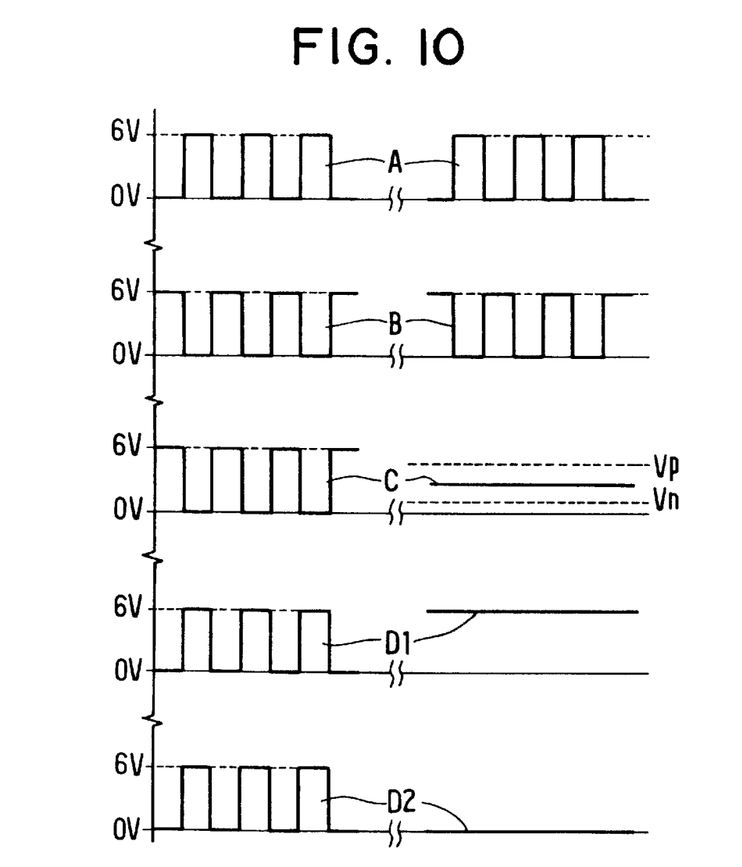

Provided that the resistance value R2 falls within the range (iii) and is set to be smaller than the resistance value R1 of ink, under the presence of ink, the digital signal C becomes different in phase from the digital signal C shown by C in FIG. 6 while having the same low and high levels as shown by C at the right side in FIG. 9. When this signal C is inputted to the hysteresis inverter 14, the digital signal D having a fixed 0V is outputted from the hysteresis inverter 14 as shown by D at the right side in FIG. 9. Thus, the CPU 20 is enabled to detect the presence/absence of ink based on the presence/absence of the digital signal D in the form of pulse train.

Further, it is assumed that the resistance value R1 of ink falls within any of the ranges (i) to (iii) and the resistance value R2 is set identical to the resistance value R1 of ink with the frequency of the digital signals A and B being set low. In this instance, the hysteresis inverter 14 is inputted with the signal C having a given voltage larger than the threshold level Vn and smaller than the threshold level Vp as shown by C at the right side in FIG. 10 in the presence of ink. Since the digital signal D having a fixed 6V or 0V is outputted from the hysteresis inverter 14 as shown by D1 or D2 at the right side in FIG. 10, the CPU 20 can detect the presence/absence of ink based on the presence/absence of the digital signal in the pulse form.

As described above, even in the case of setting the resistance value R2 of the resistor R equal to the resistance value R1 of ink, the detection of the presence/absence of ink is enabled based on the presence/absence of the pulse form of the digital signal D inputted to the detection port Q3 of the CPU 20.

Figure 11:
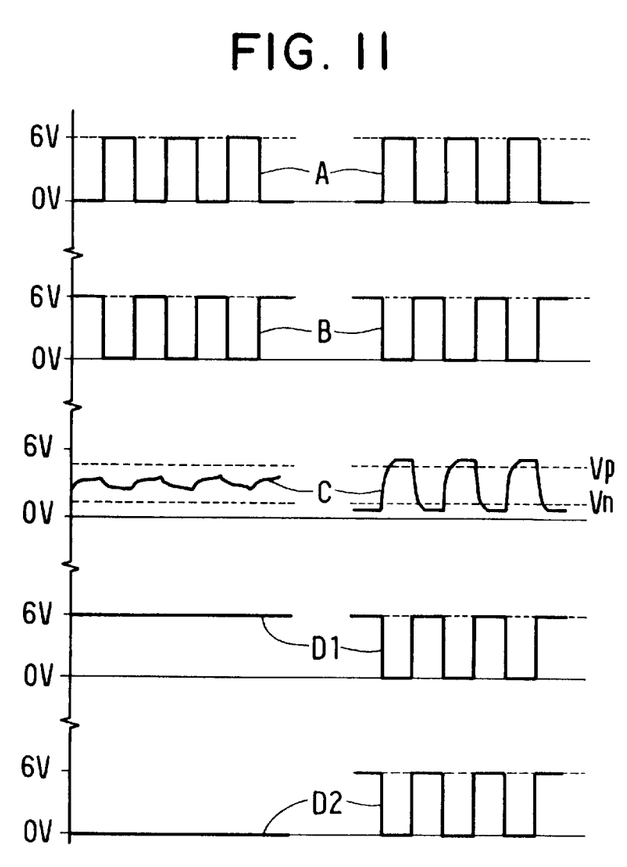

When the resistance value R2 of the resistor R is modified to be much larger than the resistance value R1 of ink (for example, R2>15R1) and the frequency F of the digital signals A and B is modified also to be much higher than in the above-described cases, the digital signal C having a low level larger than the threshold level Vn and a high level smaller than the threshold level Vp is inputted to the hysteresis inverter 14 as shown by C at the left side in FIG. 11 in the absence of ink.

This results from the existence of some capacitances (stray capacitances) in circuit components such as signal lines and logic circuits, constituting the detection circuit 10. Due to the capacitances, each signal applied to the detection circuit 10 produces rounded waveform (delay in signal level change) resulting from the time constant of CR. When the ink exists, the digital signal C outputted from the electrode 16 of the pair is subjected to waveform rounding resulting from the time constant determined by the resistance value Ri of ink as shown by C at the right side in FIG. 11. This waveform rounding is rather small. On the other hand, when no ink exists, the digital signal C is subjected to waveform rounding resulting from the time constant determined by the resistance value R2 of the resistor R. Since the resistance value R2 of the resistor R is sufficiently larger than the resistance value R1 of ink, the digital signal C outputted when no ink exists, is subjected to large waveform rounding.

That is, when no ink exists, the waveform rounding becomes large when the frequency F of the digital signal applied through the resistor R increases. Therefore, the voltage of the digital signal C outputted from the electrode 16 connected to the resistor R results in a signal having an extremely small peak-to-peak change as shown at the left side in FIG. 11 because each pulse is applied in succession in a short period of time before the voltage greatly changes.

When the digital signal C inputted to the hysteresis inverter 14 is inputted in timing required to rise from the low to high levels, the digital signal D outputted from the hysteresis inverter 14 becomes a signal D1 having a fixed 6V. On the other hand, when the digital signal C is inputted to the hysteresis inverter 14 in timing required to fall from the high to low levels, the digital signal D outputted from the hysteresis inverter 14 becomes a signal having a fixed 0V.

Thus, when the digital signal inputted to the detection port Q3 is not in the form of pulse train, the CPU 20 can determine the absence of ink. On the other hand, when the digital signal D is in the pulse form, the CPU 20 can determine the presence of ink.

Thus, according to the second embodiment, the presence/absence of ink can be detected based on the presence/absence of the pulse even when the frequency F of the digital signals applied to the electrodes 16 and 18 is set high.

Thus, in the above-described embodiments, since the conventional A/D converter circuit is unnecessary and all the signals used to detect the presence/absence of ink are digital signals in the form of pulse train, the ink presence/absence detecting device can be simplified in circuit configuration and hence the reliability of the ink presence/absence detecting device can be enhanced.

Figure 15:
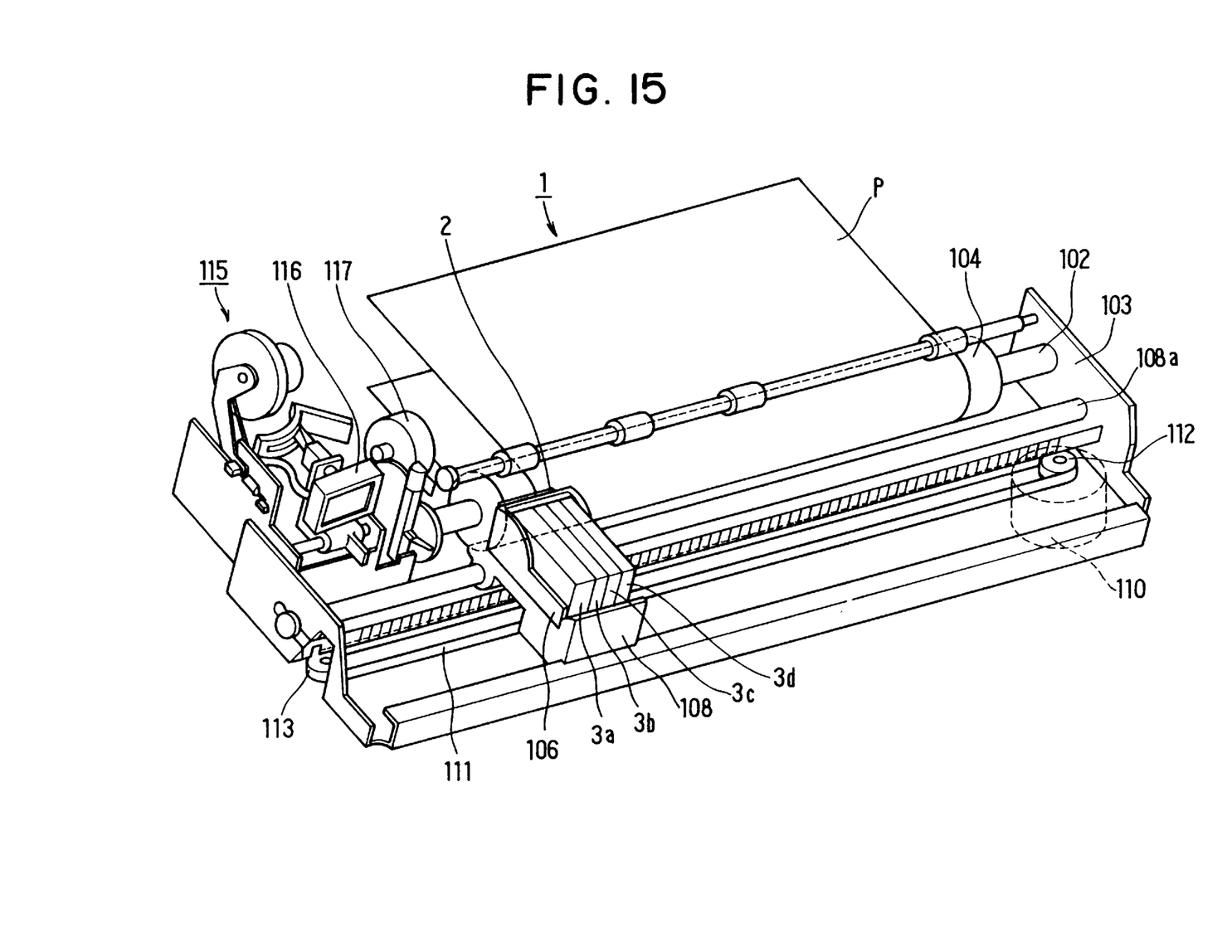
FIG. 15 is an perspective view showing an ink-jet printing device to which the first and the second embodiments are applied.
Figure 16:
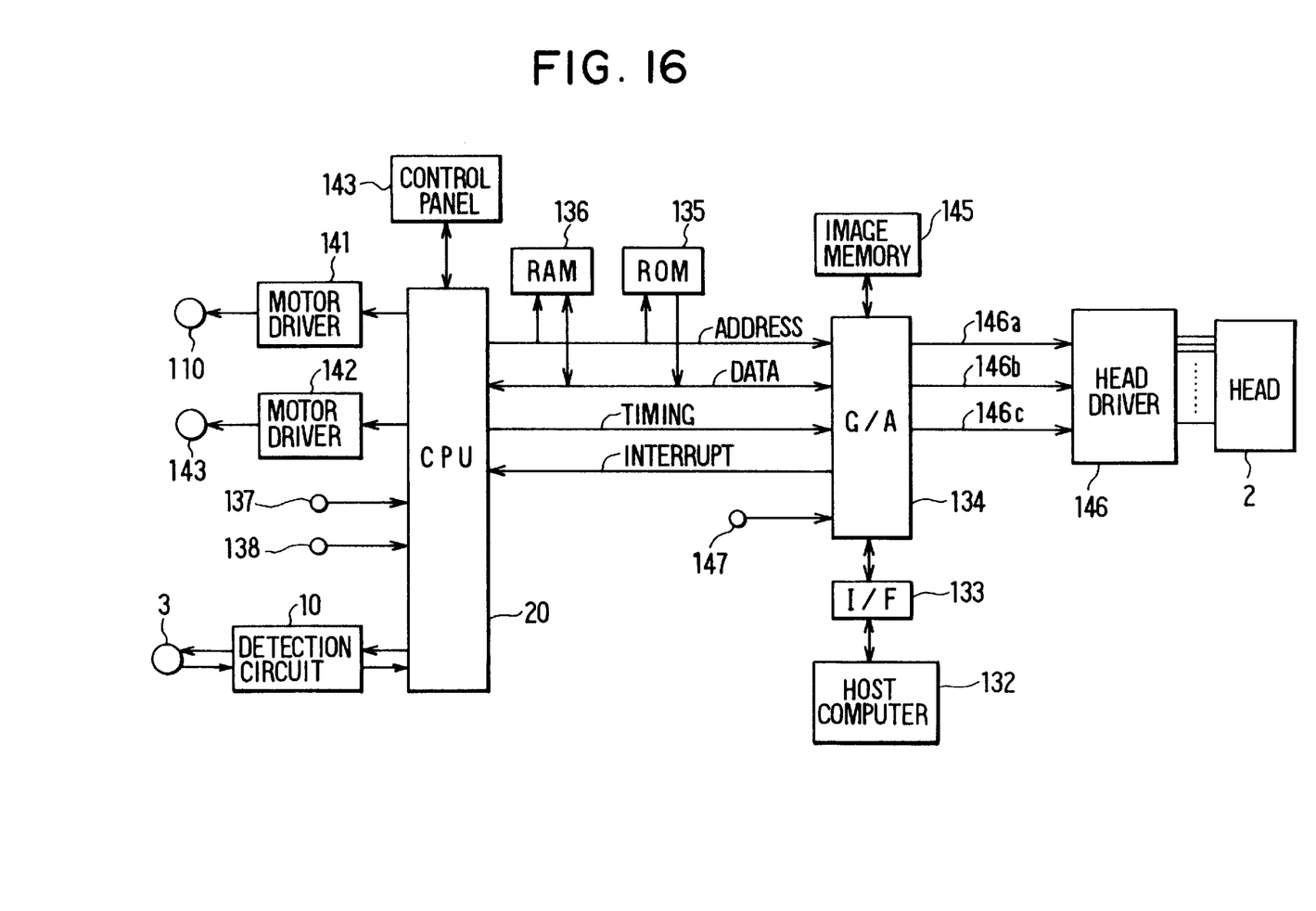
FIG. 16 is an electric wiring diagram in block form showing a principal configuration of a control system of the ink-jet printing device shown in FIG. 15.

The detecting device according to the above-described embodiments may be applied to an ink-jet printing device shown in FIGS. 15 and 16.

The ink-jet printing device 1 has a cylindrical platen roller 104 rotatably supported on a frame 103 by a rotatable shaft 102 extending in the left and right directions in FIG. 15. The platen roller 104 conveys printing paper P used as a printing medium supplied from a paper-feeding cassette or a manual paper feeding mechanism while facing an ink-jet head 2 and constitutes a part of a paper-feed or carriage device. The ink-jet head 2 is detachably mounted on a carriage 108 together with a head unit 106 and the ink cartridge 3 (3a–3d) for supplying inks of four colors (yellow, magenta, cyan and black) to the ink-jet head 2.

Further, the carriage 108 has a front portion supported by a carriage shaft 108a provided in parallel to the axis of the platen roller 104. Thus, the ink-jet head 2 mounted on the carriage 108 performs a printing operation while slidingly moving in the direction in which the ink-jet head 2 crosses over the printing paper P supported on the platen roller 104. A carriage motor 110 for driving the carriage 108 serves so as to drive the carriage 108 through a belt 111 and pulleys 112 and 113.

A purge device 115 for recovering non-delivery of the ink-jet head 2 or a failure in the delivery thereof is disposed on the left side of the platen roller 104, i.e., beyond the range of printing on the printing paper P. The purge device 115 is provided with a suction cap 116. The suction cap 116 covers a nozzle of the ink-jet head 2 and absorbs or sucks defective ink inside the ink-jet head 2 so as to recover the ink-jet head 2. The purge device 115 shares the use of the platen roller 104 and a drive source with a line feed (LF) motor 143 (FIG. 16) as the drive source. When the carriage 108 enters a recovery region, a driving force of the line feed motor 143 is transmitted to the purge device 115 through a pump cam gear 117.

An electronic control system of the ink-jet printing device 1 may be constructed as shown in FIG. 16. The system includes the CPU 20 for controlling respective portions of the ink-jet printing device 1, and a gate array ("G/A circuit") 134 for receiving printed data sent from a host computer 132 therein through an interface 133 and controlling the expansion of the printed data. A ROM 135 with working programs or the like stored therein and a RAM 136 for temporarily storing the printed data received by the G/A circuit 134 from the host computer 132 are provided between the CPU 20 and the G/A circuit 134 and connected to an address bus and a data bus.

Further, a paper sensor 137 for detecting the presence/absence of the printing paper P, a home position sensor 138 for detecting a home position of the ink-jet head 2, and the detection circuit 10 for detecting the presence/absence of ink held within the ink cartridge 3 are electrically connected to the CPU 20. The CPU 20 functions as a detection mechanism for detecting the presence/absence of the ink held within the ink cartridge 3, based on the detection circuit 10.

A first motor driver 141 for driving the carriage motor 110, a second motor driver 142 for driving the line feed motor 143, a control panel 143 for supplying various signals to the CPU 20, etc. are electrically connected to the CPU 20. An image memory 145 for temporarily storing the printing data received from the host computer 132 as image data is electrically connected to the G/A circuit 134. An ink-jet head driver 146 operates based on printing data 146a, a transfer clock 146b and a print clock 146c outputted from the G/A circuit 134 so as to drive the ink-jet head 2. An encoder sensor 147 for measuring a traveling speed of the carriage 108 and determining printing timing is also electrically connected to the G/A circuit 134.

While the present invention has been described with reference to the illustrative embodiments, this description is not intended to be construed in a limiting sense. Various alterations and modifications of the embodiments will be apparent to those skilled in the art on reference to this description.

What is claimed is:

1. A liquid presence/absence detecting device comprising:
   a first electrode and a second electrode for extracting a resistance value between two points in a liquid chamber;
   a resistor connected to the first electrode;
   digital signal applying means for applying a first and a second digital signals in a pulsed form different in phase from each other to the first and the second electrodes, respectively; and
   detecting means for detecting a presence/absence of the liquid based on a presence/absence of a phase a third digital signal developed in a pulsed form between the resistor and the first electrode when the first and the second digital signals are applied to the first and the second electrodes respectively by the digital signal applying means.

2. A liquid presence/absence detecting device according to claim 1, the digital signal applying means includes a CPU which produces the first and the second digital signals from output ports thereof to be applied to the first and the second electrodes respectively.

3. A liquid presence/absence detecting device according to claim 1, wherein the detecting means includes a CPU and a Schmidt trigger circuit which shapes a waveform of the third digital signal and applies the same to an input port of the CPU for detection of the presence/absence of the liquid.

4. A liquid presence/absence detecting device according to claim 1, wherein the digital signal applying means includes a first and a second buffers which apply the first and the second digital signals to the first and the second electrodes respectively.

5. A liquid presence/absence detecting device according to claim 1, wherein the resistor has a resistance value larger than a resistance value of the liquid.

6. A liquid presence/absence detecting device according to claim 1, wherein the resistor has a resistance value substantially equal to the resistance value of the ink.

7. A liquid presence/absence detecting device according to claim 1, wherein the resistor has a resistance value sufficiently larger than a resistance value of the ink, and the first and the second digital signals have a frequency of at least 1 MHz.

8. A liquid presence/absence detecting device according to claim 1, further comprising:

an ink tank including the liquid chamber for holding ink as the liquid; and an ink-jet head for selectively discharging from a nozzle droplets of the ink supplied from the ink tank through the chamber.

9. A liquid presence/absence detecting device according to claim 1, further comprising:

a plurality of ink tanks for holding inks in different colors as the liquid respectively, wherein the first and the second electrodes are provided on each of the ink tanks to be selectively connected to the digital signal applying means, the resistor and the detecting means.

10. A liquid presence/absence detecting device according to claim 9, wherein a resistance of the resistor is determined to change the third digital signal in response to the presence/absence of the ink for all the colors of inks.

11. A liquid presence/absence detecting device according to claim 1, wherein the first digital signal and the second digital signal are the same in frequency and opposite in phase to each other.

12. A liquid presence/absence detecting device according to claim 1, wherein the first electrode and the second electrode are in a needle shape.

13. A liquid presence/absence detecting device comprising:

a plurality of ink cartridges including chambers which contain inks of different colors respectively;

a first electrode and a second electrode provided in each of the plurality of chambers;

digital signal applying means for applying a first and a second digital signals in a pulsed form different in phase from each other to the first and the second electrodes of the chambers selectively;

a resistor selectively connectable to the first electrode of the chambers and having a resistance value larger than a largest one of the resistances of the inks of different colors; and detecting means for detecting a presence/absence of the ink between the first and the second electrodes based on a third digital signal developed in a pulsed form between the resistor and the first electrode connected to the resistor.

14. A liquid presence/absence detecting device according to claim 13, wherein the detecting means is constructed to compare a phase of the third digital signal with a phase of at least one of the first and the second digital signals.

15. A liquid presence/absence detecting device according to claim 11, wherein the first digital signal and the second digital signal are the same in frequency and opposite in phase to each other.

16. A liquid presence/absence detecting device according to claim 11, wherein at least one of the first electrode and the second electrode is in a needle shape.

17. A liquid presence/absence detecting device comprising:

a first electrode and a second electrode for extracting a resistance value between two points in a liquid chamber;

a resistor connected to the first electrode;

digital signal applying means for applying a first and a second digital signals in a pulsed form different in phase from each other to the first and the second electrodes, respectively; and detecting means for detecting a presence/absence of the liquid based on a phase of a third digital signal developed in a pulsed form between the resistor and the first electrode when the first and the second digital signals are applied to the first and the second electrodes respectively by the digital signal applying means.

18. A liquid presence/absence detecting device according to claim 17, the digital signal applying means includes a CPU which produces the first and the second digital signals from output ports thereof to be applied to the first and the second electrodes respectively.

19. A liquid presence/absence detecting device according to claim 17, wherein the digital signal applying means includes a first and a second buffers which apply the first and the second digital signals to the first and the second electrodes respectively.

20. A liquid presence/absence detecting device according to claim 17, wherein the resistor has a resistance value larger than a resistance value of the liquid.

21. A liquid presence/absence detecting device according to claim 17, wherein the resistor has a resistance value substantially equal to the resistance value of the ink.

22. A liquid presence/absence detecting device according to claim 17, wherein the resistor has a resistance value sufficiently larger than a resistance value of the ink, and the first and the second digital signals have a frequency of at least 1 MHz.

23. A liquid presence/absence detecting device according to claim 17, further comprising:

an ink tank including the liquid chamber for holding ink as the liquid; and an ink-jet head for selectively discharging from a nozzle droplets of the ink supplied from the ink tank through the chamber.

24. A liquid presence/absence detecting device according to claim 17, further comprising:

a plurality of ink tanks for holding inks in different colors as the liquid respectively, wherein the first and the second electrodes are provided on each of the ink tanks to be selectively connected to the digital signal applying means, the resistor and the detecting means.

25. A liquid presence/absence detecting device according to claim 17, wherein a resistance of the resistor is determined to change the third digital signal in response to the presence/absence of the ink for all the colors of inks.

26. A liquid presence/absence detecting device according to claim 17, wherein the first digital signal and the second digital signal are the same in frequency and opposite in phase to each other.

27. A liquid presence/absence detecting device according to claim 17, wherein at least one of the first electrode and the second electrode is in a needle shape.

* * * * *